(12) United States Patent
Herrick et al.

(10) Patent No.: US 8,179,978 B2
(45) Date of Patent: *May 15, 2012

(54) MPEG FIELD DATA-DRIVEN DISPLAY

(75) Inventors: Jason Herrick, Newark, CA (US);
Darren Neuman, Palo Alto, CA (US);
Greg A. Kranawetter, Laguna Hills, CA (US); Sandeep Bhatia, Bangalore (IN)

(73) Assignee: Broadcom Corporation, Irvine, CA (US)

(*) Notice: Subject to any disclaimer, the term of this patent is extended or adjusted under 35 U.S.C. 154(b) by 186 days.

This patent is subject to a terminal disclaimer.

(21) Appl. No.: 12/635,424

(22) Filed: Dec. 10, 2009

(65) Prior Publication Data

US 2010/0086060 A1    Apr. 8, 2010

Related U.S. Application Data

(63) Continuation of application No. 11/025,327, filed on Dec. 29, 2004, now Pat. No. 7,653,135.

(60) Provisional application No. 60/532,959, filed on Dec. 29, 2003.

(51) Int. Cl.
*H04N 7/12* (2006.01)

(52) U.S. Cl. .......... 375/240.25; 375/240.01; 375/240.12
(58) Field of Classification Search ................ 375/240, 375/240.01, 240.12, 240.25; 348/390.1, 348/472; 345/418, 533
See application file for complete search history.

(56) References Cited

U.S. PATENT DOCUMENTS

| | | | | |
|---|---|---|---|---|
| 5,329,360 A * | 7/1994 | Gillard et al. | ............... | 348/472 |
| 5,598,514 A * | 1/1997 | Purcell et al. | ............... | 345/418 |
| 5,949,441 A * | 9/1999 | Ristau | ............... | 345/533 |
| 6,295,089 B1 * | 9/2001 | Hoang | ............... | 348/390.1 |

* cited by examiner

*Primary Examiner* — Allen Wong
(74) *Attorney, Agent, or Firm* — Thomas, Kayden, Horstemeyer & Risley, LLP

(57) ABSTRACT

A system and method that support display of video fields using related data encoded in data structures. Each data structure is associated with one video field and contains all the information associated with the display of the video field. The data structure is encoded with the video field that is displayed exactly one field prior to the field associated with the data structure. In an embodiment of the present invention, the data structure contains all the information associated with the display of a video field, regardless of whether certain data changes from one field to the next.

19 Claims, 5 Drawing Sheets

MPEG FIELD DATA-DRIVEN DISPLAY

RELATED APPLICATIONS

This application claims priority to "MPEG FIELD DATA-DRIVEN DISPLAY", and is a continuation of U.S. patent application Ser. No. 11/025,327 filed Dec. 29, 2004, now U.S. Pat. No. 7,653,135 issued on Jan. 26, 2010, which claims priority to U.S. Provisional Patent Application Ser. No. 60/532,959, entitled "MPEG Field Data-Driven Display," filed on Dec. 29, 2003, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

MPEG decoders receive and decode field-related data for display. The data associated with a certain field of a picture comprises properties of the field such as, for example, pan-scan, field polarity, aspect ratio, picture size, etc. This data is essential for displaying the correct picture at the correct time. Some of these properties may change with every field, and some may not.

Existing systems utilize MPEG bit streams to send field properties in sequence headers and picture headers. Sequence headers may occur every second or less. Picture headers accompany the pictures. MPEG encodes headers such that they, the headers, can be sent a number of fields ahead of the display time of the field associated with data in the header. As a result, current systems send headers to the decoders with field data sometimes long in advance of the display time of the associated field, and the data is frequently sent out of order. For example, in a system that uses prediction with reference frames, the reference frames (I or P frames) are sent and decoded in a different order from their display order.

Additionally, a portion of the data associated with a certain field may be sent in the sequence header, whereas another portion of the data may be sent in the picture header, yet another portion of the data may be sent at the display time for the field. As a result, the data associated with a field is sent to the decoder at separate times and not necessarily in any specific order. The decoder then decodes the data in the order it is received and sends the decoded information to a host where the fields will be sent for display. The host utilizes host software to sort out the scrambled data and re-order it in the appropriate display order. As a result there may be delays in the display process.

Other problems may arise with such implementations, when erroneous data is sent, the decoder may not make notice of it, because it is out of order, and is only a portion of the data for a certain field. However, this may become problematic at the display stage, when the host software processes the data for a certain field, the errors may be unfixable, and may cause display distortions. This is especially challenging in systems utilizing reference frames for prediction of other frames, where an error in a reference frame surely causes errors in frames predicted based on the reference frame, but there would be no way to know of such problems until the time of display of the frames. As a result, time would have been wasted processing erroneous data that needs to be discarded anyway.

Another problem with existing implementations may be in a situation where a user chooses to pause or skip a certain picture before it is displayed or as it is being displayed. In such a case, because portions of the data associated with the picture may have been sent well ahead of the display time, the host software would have already processed the data and re-ordered it in preparation for the correct display time, but as a result of pausing, for example, all the processed information will be discarded. As a result resources of the system are wasted on processing unnecessary data.

Yet another problem with current implementations is that certain data associated with a field is only sent to the decoder, and later to the display host, if the data changes. This may cause further delays and problems, because the host never knows what data to expect for each frame.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a machine-readable storage having stored thereon, a computer program having at least one code section that prepares encoded video fields for display. The at least one code section is executable by a machine for causing the machine to perform steps comprising decoding the video fields; decoding data associated with the video fields; gathering the data associated with each one of the video fields; and packaging the gathered data associated with each one of the video fields in data structures, wherein each data structure is associated with one video field. Each data structure contains properties of the field with which it is associated and each field is displayed using its properties.

The machine-readable storage further comprises code for encoding each data structure with a video field and sending the video fields to a display in the order in which the video fields are to be displayed, where each data structure is encoded with a video field that is displayed exactly one field before the video field with which the data structure is associated.

An embodiment of the present invention comprises a machine-readable storage having stored thereon, a computer program having at least one code section that prepares encoded video fields for display. The machine-readable storage comprises code for packaging data associated with each one of the video fields in data structures, wherein each data structure is associated with one video field; and for sending to a display the data structure of the associated video field exactly one video field prior to displaying the associated video field.

In an embodiment of the present invention, the display decodes each video field and data structure and displays each field using its properties, which are contained in the associated data structure.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
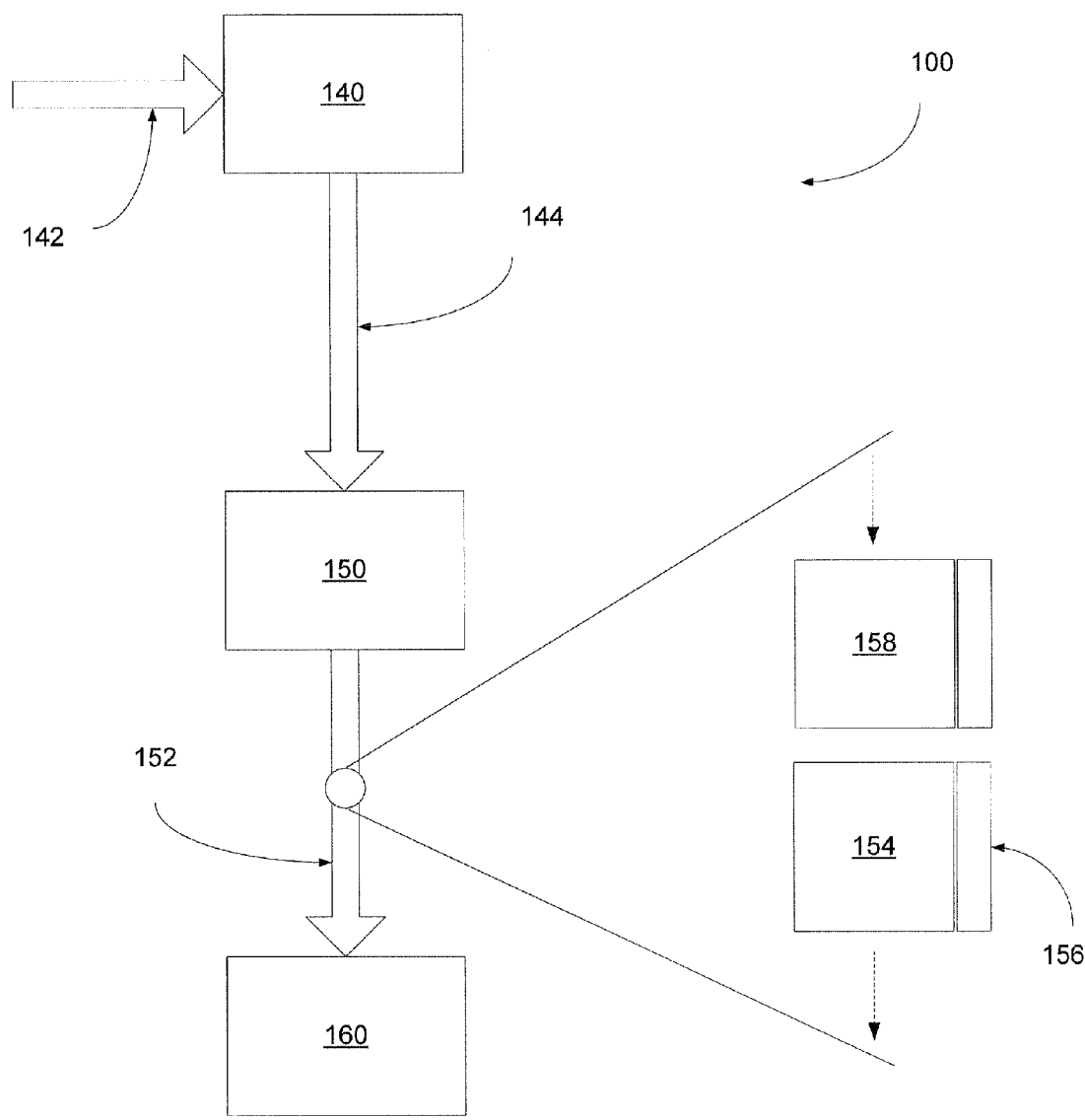
FIG. 1a illustrates a block diagram of an exemplary system with a MPEG field data-driven display, in accordance with an embodiment of the present invention.

The present invention relates generally to the display of MPEG video. More specifically, the present invention relates to MPEG field properties and their flow from the MPEG decoder to the hardware that displays the MPEG video. While the following discusses the invention in terms of MPEG video, aspects of the present invention may also be used with other video coding standards such as, for example, AVC/H.264 video.

In an embodiment of the present invention, a MPEG decoder may provide a buffer and its properties for every field one field prior to it being fed into the display. The provided buffer and its properties may describe the data required to display the next field in the video sequence. The data associated with any field may be provided at one fixed point in time relative to the display time of the field.

In an embodiment of the present invention, the data associated with a certain field may contain some errors, which may affect the display of the field. In such an embodiment, the errors may be such that the decoder may not be able to recover the proper information. As a result the decoder may discard the erroneous field, without sending it to the host for display. Thus, the decoder may avoid wasting processing time by not attempting to recover an unrecoverable error.

In an embodiment of the present invention, the system may utilize predictive coding, with reference fields utilized to predict other fields. In a case where the decoder finds the data associated with a certain field to be erroneous and the error unrecoverable, the decoder may discard the field and any other fields the decoding of which depends on the discarded erroneous field. If the erroneous field is a reference field in a video sequence utilizing predictive coding, the decoder may discard all fields predicted based on the erroneous reference field. For example, the decoder may discover that a certain P field is erroneous. The decoder may then inform the display host that an error has occurred with the P field. As a result, the display host will skip the B fields following the erroneous P field and display the next I or P field without wasting processing time on processing information associated with the B fields that depend on the erroneous P field, and hence cannot be decoded and displayed anyway.

In an embodiment of the present invention, the decoder may send all data associated with a field, whether the data has changed or not. For example, the picture size may remain unchanged for a number of fields to display, however, the display host may receive picture size information with every field regardless of whether is has changed or not. As a result, the process of decoding the fields and the information related to each field remains the same, and no special processes or code need be implemented to determine which information remained the same and which changed. This may also limit the number of interrupts used in the decoding and displaying process, which may conserve processing time.

In an embodiment of the present invention, data associated with a field may be entirely stored in one data structure. The display host may receive the data structure a fixed amount of time ahead of display of the field with which the data structure is associated.

In an embodiment of the present invention, a data structure associated with a field may comprise a description section, a type section, and a how-used section. The description section of a data structure may contain the description of the data that is being sent. The type section of a data structure may indicate the type of the data being sent such as, for example, BAVC_FieldPolarity, which may be an enumeration that contains the polarity of a field of an interrupt. Another example of a type section of a data structure may be BAVC_ScanType, which may be an enumeration indicating the scan type, i.e. progressive or interlaced. The type section corresponds to the description section. For example, if the description section indicates that the data indicates the scan type, then the type section is a type that indicates whether the data is in interlaced or progressive format. The how-used section of a data structure may describe how the data is used. For example, a data structure containing information regarding the scan type may be used only when the associated field is displayed, and as a result, the how-used section may indicate that only the display device may process this data structure. Table 1 below illustrates exemplary values for the fields of the data structures, in accordance with an embodiment of the present invention. An embodiment of the present invention, may use a portion of these values in additional to other values, which may have not been specified by Table 1. The how-used section may be different depending on the component within the system through which the data structure may be passing.

TABLE 1

| Description | Type | How used |
|---|---|---|
| Source polarity | Top field/Bottom field | For passing to display control |
| Scan type | Interlaced/Progressive | For passing to display control |
| MPEG type | MPEG1/MPEG2 | For passing to display control Can be used by video decoder |
| YcbCr format | 4:2:0/4:2:2 | For passing to display control |
| Luminance Frame Buffer Start Address | uint32_t | For passing to display control |
| Chrominance Frame Buffer Start Address | uint32_t | For passing to display control |
| Chrominance Interpolation Mode | Frame/Field | For passing to display control |
| Source horizontal size | Unsigned integer | For passing to display control |
| Source vertical size | Unsigned integer | For passing to display control |
| Display horizontal size | Unsigned integer | For passing to display control |
| Display vertical size | Unsigned integer | For passing to display control |
| Raw Color Primary and Transfer Characteristics | uint16_t | For passing to display control |
| Progressive | bool | For passing to display control |

TABLE 1-continued

| Description | Type | How used |
|---|---|---|
| sequence Aspect ratio | 4:3/16:9/1:1/2:2.21 | For passing to display control |
| Frame ratio code | 23.976/24/25/29.97/ 30/50/59.94/60 | For passing to display control |

In an embodiment of the present invention, the data structures may also comprise a format-change flag, which may indicate a format change has occurred, allowing code to process/ignore certain fields.

FIG. 1a illustrates a block diagram of an exemplary system 100 with a MPEG field data-driven display, in accordance with an embodiment of the present invention. The system 100 may be part of a video processing system comprising a video encoder 140, a video decoder 150, and a video display 160. The video encoder 140 may encode the fields of an input stream of video 142 for transmission to the video decoder 150. The video encoder 140 may encode with each video field data in a buffer associated with the next video field, in the order in which the video fields are to be displayed. The encoded video fields may then be transmitted to the video decoder 150. The decoder 150 may then decode the stream of incoming encoded video fields 144. In an embodiment of the present invention, the order in which the fields is decoded may not necessarily be the order in which the fields are displayed such as, for example, in a system utilizing predictive coding techniques.

The output 152 of the decoder 150 may contain a decoded video field 154 in addition to a buffer 156 containing data associated with a next decoded video field 158, wherein the video field 158 is displayed after video field 154 is displayed. The output 152 may then be fed into the video display 160. The decoded video fields with the data buffers may be processed before display to ensure that each video field is displayed properly according to the data associated with it, which may be processed with the previous video field. For example, when field 154 is decoded, the buffer 156 containing the data associated with displaying field 158 may also be decoded. As a result, when the field 158 is sent to the display 160, the data describing parameters associated with its display may already be available to the display device 160.

Figure 1B:
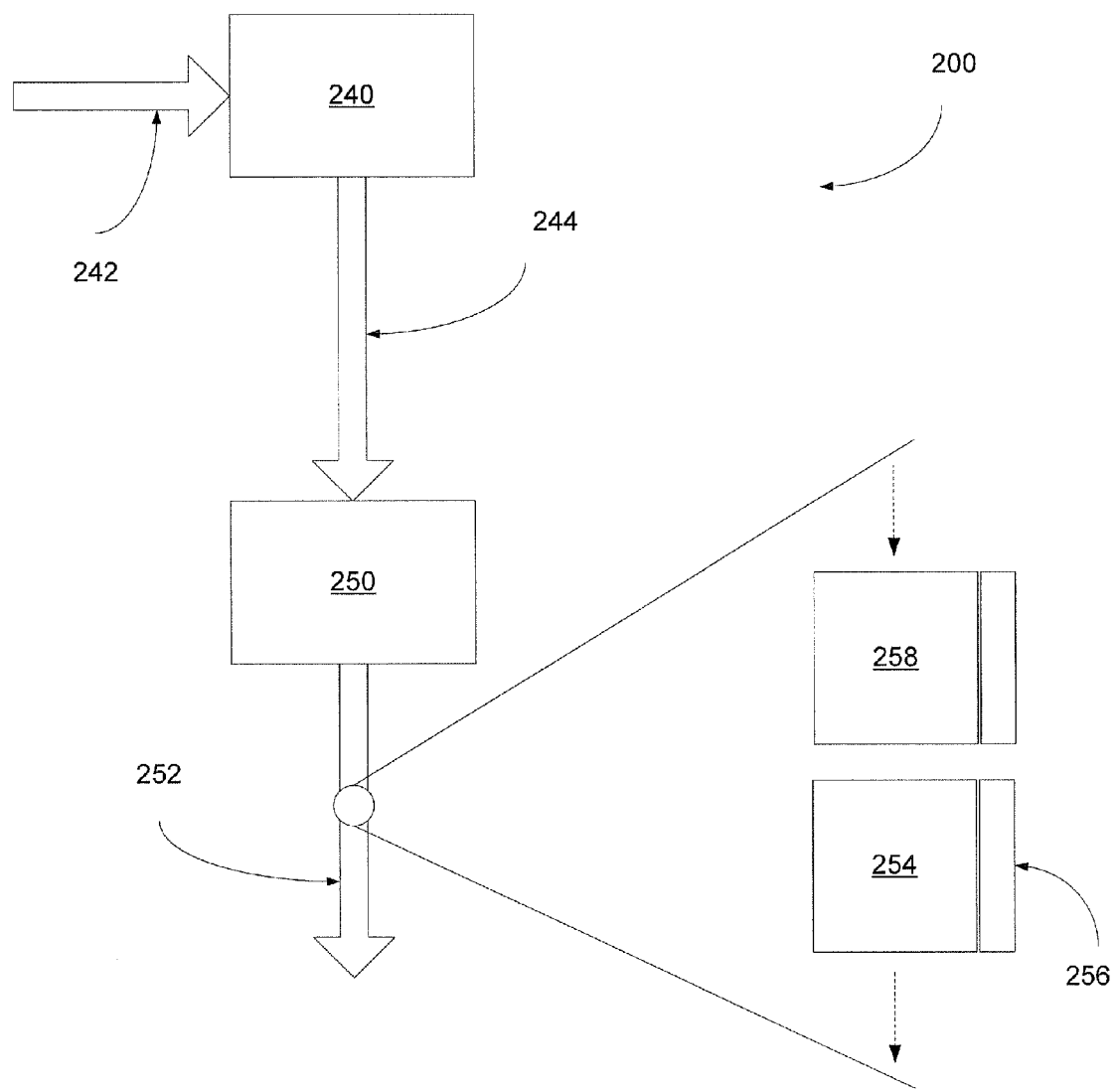
FIG. 1b illustrates a block diagram of another exemplary system with a MPEG field data-driven display, in accordance with an embodiment of the present invention.

FIG. 1b illustrates a block diagram of another exemplary system 200 with a MPEG field data-driven display, in accordance with an embodiment of the present invention. The system 200 may be part of a video processing system comprising a video decoder 240 and a video encoder 250. The video decoder 240 may have an input 242 comprising a stream of encoded video and data associated with the frames of the encoded video. The output 244 of the decoder may then be the input to the video encoder 250. The video encoder 250 may then encode the decoded video, along with the associated data, such that the output 252 may comprise output buffers comprising encoded video field 254 with the data 256 associated with the next encoded video field 258. The system 200 may be utilized in such applications as, for example, personal video recorders (PVRs).

Figure 1C:
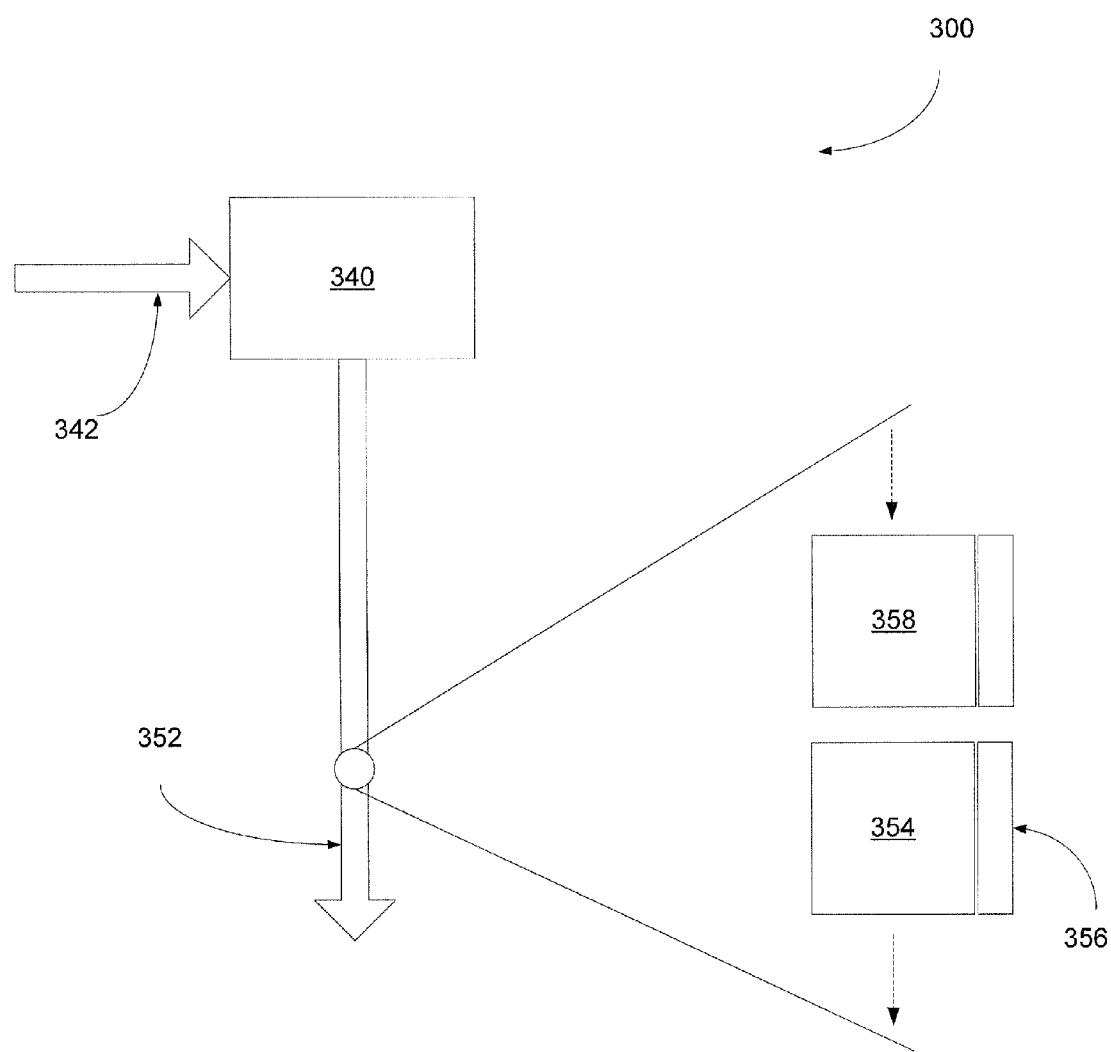
FIG. 1c illustrates a block diagram of yet another exemplary system with a MPEG field data-driven display, in accordance with an embodiment of the present invention.

FIG. 1c illustrates a block diagram of yet another exemplary system 300 with a MPEG field data-driven display, in accordance with an embodiment of the present invention. The system 300 may be part of a video processing system comprising a video decoder 340. The video decoder 340 may have an input 342 comprising a stream of encoded video and data associated with the frames of the encoded video. The output 352 of the decoder may then be the input to a display device.

The video decoder 340 may decode the input encoded video 342, then encode the decoded video, along with the associated data, such that the output 352 may comprise output buffers comprising encoded video field 354 with the data 356 associated with the next encoded video field 358. The system 300 may be utilized in such applications as devices that read video data from a storage device such as, for example, DVD, hard disk, etc.

An embodiment of the present invention may be demonstrated in a MPEG video decoder (MVD) such as, for example, the video decoder 150 of FIG. 1a. In a MPEG video decoder (MVD), data may be passed between the MPEG video decoder (MVD) and firmware on one end, and between the MPEG video decoder (MVD) and a video display control (VDC) on another end. The video display control (VDC) may be part of a video display such as, for example, the video display 160 of FIG. 1a. The MPEG video decoder (MVD) and firmware may not be capable of passing data directly to the video display control (VDC); as a result, data may need to pass through a high-level software (HLS) callback. In an embodiment of the present invention, the high-level software (HLS) callback may be registered with the MPEG video decoder (MVD).

In an embodiment of the present invention, when the high-level software (HLS) callback is called, it may pass the data to the video display control (VDC). The firmware may pass the data through the MPEG video decoder (MVD) to get to the high-level software (HLS) callback. Data structures may be used to pass data from the firmware to the MPEG video decoder (MVD), the MPEG video decoder (MVD) to a HLS callback, and the high-level software (HLS) callback to the video display control (VDC). In an embodiment of the present invention, the data may be given to a module to pass the data along such as, for example, data being sent by the firmware to the MPEG video decoder (MVD), which may pass the data along to a high-level software (HLS) callback to pass the data to the video display control (VDC). In such an embodiment, it may be specified that the data is being passed along so it is clear what work may have to be done and by which module of the system.

Figure 2:
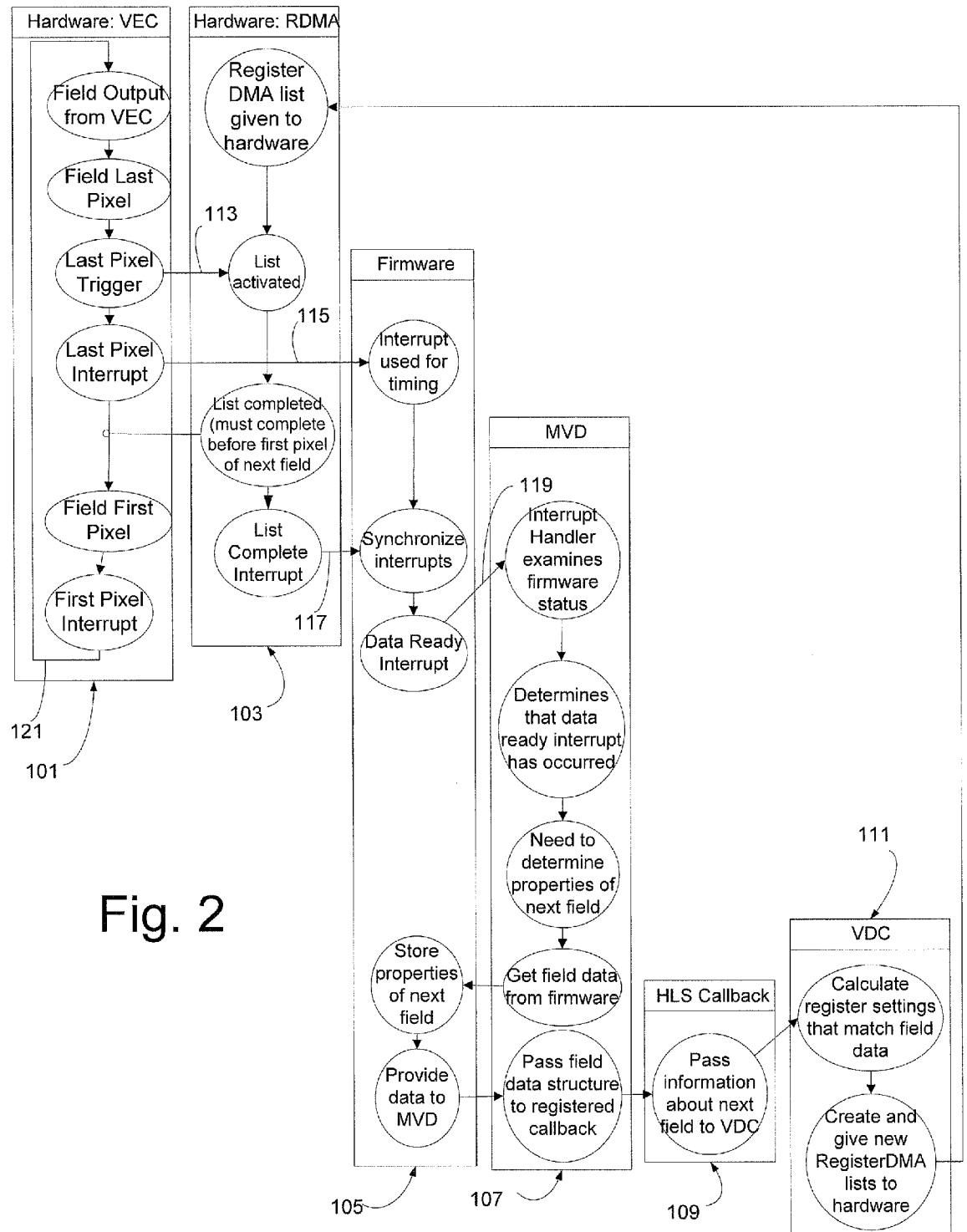
FIG. 2 illustrates a flow diagram of an exemplary data flow, in accordance with an embodiment of the present invention.

FIG. 2 illustrates a flow diagram of an exemplary data flow, in accordance with an embodiment of the present invention. The Hardware Video Encoder (VEC) section 101 may contain a repeating cycle through which the data in the system, i.e. the pixels of the processed field, may flow: Field Output→Field Last Pixel→Last Pixel Trigger→Last Pixel Interrupt→Field First Pixel→First Pixel Interrupt→and back to the Field Output.

In an embodiment of the present invention, the Hardware Video Encoder (VEC) 101 may drive two main events. The first event may occur on the Last Pixel Trigger 113, upon which the Register Direct Memory Access (DMA) 103 list may be activated. The Register Direct Memory Access (DMA) lists may contain commands utilized to drive the next field, so the lists are completed before the Hardware Video Encoder (VEC) reaches the Field First Pixel stage. In an embodiment of the present invention, when a list is completed, the List Complete Interrupt 117 may occur, which may indicate that the video display control (VDC) 111 can modify the Register Direct Memory Access (DMA) lists for the next field.

The other event driven by the Hardware Video Encoder (VEC) 101 may occur on the Last Pixel Interrupt 115, upon which the Firmware 105 may be signaled.

In an embodiment of the present invention, the firmware 105 may synchronize with the List Complete Interrupt 117. While the firmware 105 may not need the List Complete Interrupt 117, synchronizing with it may allow host processing to be single threaded. For example, when the firmware 105 has data to send to the host, and signals so to the MPEG video decoder (MVD) 107 using the Data Ready Interrupt 119, synchronization may also indicate that the occurrence of the Data Ready Interrupt 119 signals list complete, allowing the video display control (VDC) 111 to change the Register Direct Memory Access (DMA) lists.

In another embodiment of the present invention, the First Pixel Interrupt 121, instead of the Last Pixel Interrupt 115, may drive the firmware 105. In such an embodiment, the synchronization with the List Complete Interrupt 117 may not be utilized, because the List Complete Interrupt 117 fires after the Last Pixel Trigger.

Once synchronized, the firmware 105 may notify the host that data is ready to be processed by firing the Data Ready Interrupt 119 to the MPEG video decoder (MVD) 107. The MPEG video decoder (MVD) 107 may then process the Data Ready Interrupt 119, verify that the interrupt means data is ready, query the firmware 105 for information about the field, and then pass this information along to a high-level software (HLS) callback 109.

In an embodiment of the present invention, the high-level software (HLS) callback 109 may then pass the information to the video display control (VDC) 111. The video display control (VDC) 111 may, in turn, create the Register Direct Memory Access (DMA) lists for the next field and activate the created lists. The Last Pixel Trigger 113 of the Hardware Video Encoder (VEC) 101 may then trigger the Register Direct Memory Access (DMA) lists, and the cycle repeats.

Figure 3:
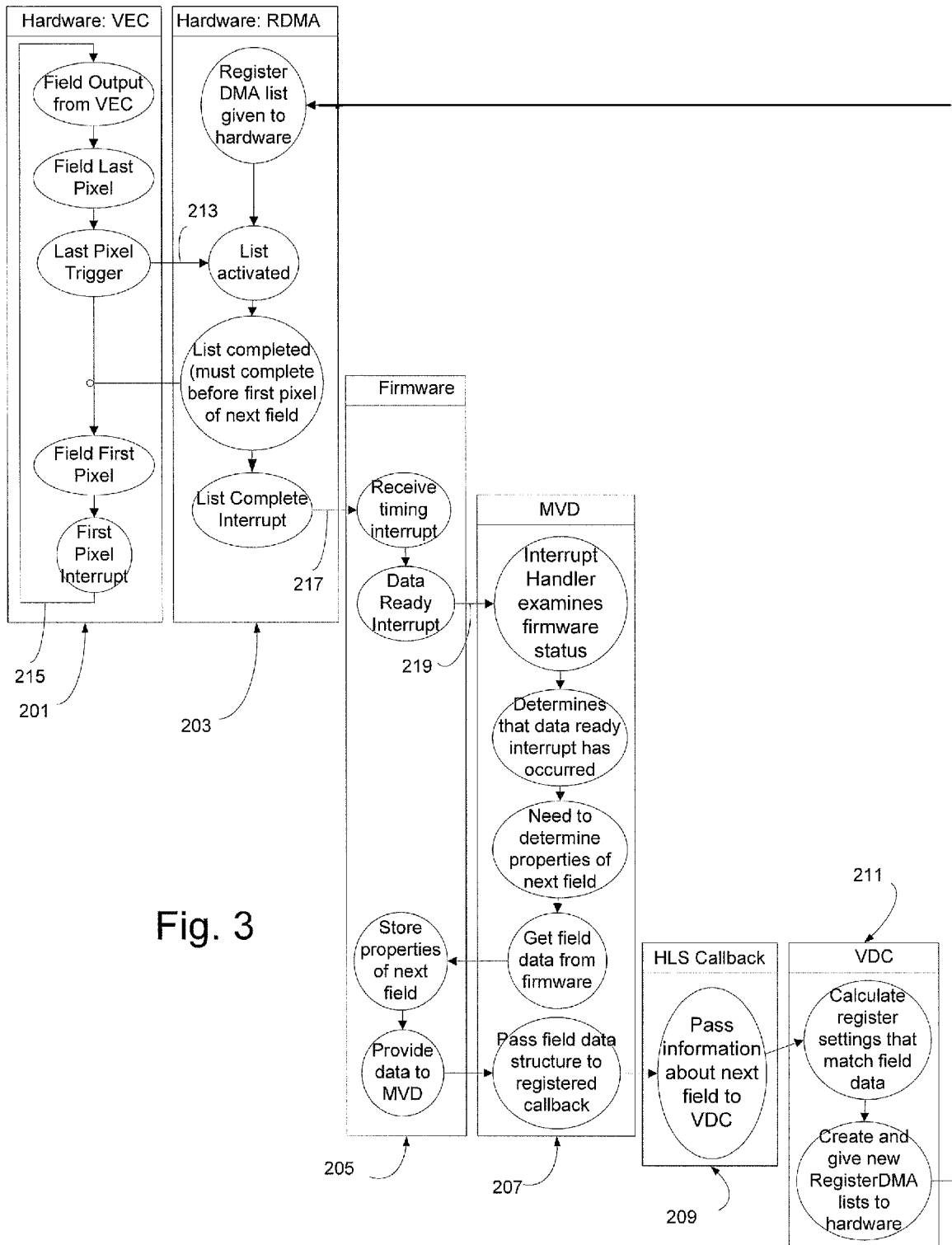
FIG. 3 illustrates another flow diagram of an exemplary alternative data flow, in accordance with an embodiment of the present invention.

FIG. 3 illustrates another flow diagram of an exemplary alternative data flow, in accordance with an embodiment of the present invention. The Hardware Video Encoder (VEC) section 201 may contain a repeating cycle through which the data in the system, i.e. the pixels of the processed field, may flow: Field Output→Field Last Pixel→Last Pixel Trigger→Field First Pixel→First Pixel Interrupt 215→and back to the Field Output.

In an embodiment of the present invention, the Hardware Video Encoder (VEC) 201 may drive an event, which may occur on the Last Pixel Trigger 213, upon which the Register Direct Memory Access (DMA) 203 list may be activated. The Register Direct Memory Access (DMA) lists may contain commands utilized to drive the next field, so they may be completed before the Hardware Video Encoder (VEC) reaches the Field First Pixel stage. When the list is completed, the List Complete Interrupt 217 may occur, which may indicate that the video display control (VDC) 211 can modify the Register Direct Memory Access (DMA) lists for the next field.

In an embodiment of the present invention, the firmware 205, when it has data to send to the host, and upon receiving the List Complete Interrupt 217, may signal to the MPEG video decoder (MVD) 207 using the Data Ready Interrupt 219 to notify the host that data is ready to be processed. The MPEG video decoder (MVD) 207 may then process the Data Ready Interrupt 219, verify that the interrupt means data is ready, query the firmware 205 for information about the field, and pass the information about the field to a high-level software (HLS) callback 209.

In an embodiment of the present invention, the high-level software (HLS) callback 209 may pass the information to the video display control (VDC) 211. The video display control (VDC) 211 may, in turn, create the Register Direct Memory Access (DMA) lists for the next field and activate them. The Last Pixel Trigger 213 of the VEC 201 may then trigger the Register Direct Memory Access (DMA) lists, and the cycle repeats.

In this embodiment of the present invention, the firmware 205 may be driven by the interrupt 217, which may be generated by a register in the Register Direct Memory Access (DMA) 203. In an embodiment of the present invention, the Register Direct Memory Access (DMA) engine is programmable and may be driven by a multitude of sources. As a result, the source of the interrupt driving the firmware 205 may change without requiring changes to the firmware 205. In another embodiment of the present invention, another source which may or may not be within the Register Direct Memory Access (DMA) 203 may drive the list complete interrupt 217, which may in turn drive the firmware 205. In such an embodiment, an independent module may be created to drive the interrupt that drives the firmware 205.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that prepares encoded video fields for display, the method comprising:
    decoding the video fields, with a video decoder;
    decoding non-pixel data that are uniquely associated with the video fields;
    gathering the decoded non-pixel data uniquely associated with each one of the video fields;
    packaging the gathered decoded non-pixel data uniquely associated with each one of the video fields in data structures, wherein each data structure is associated with one video field; and
    providing the data structures packaging the gathered non-pixel data associated with each one of the video fields to a display controller prior to displaying each one of the video fields that the data structures are associated with.

2. The method according to claim 1 wherein the method further comprises:
  encoding each data structure with a video field; and
  sending the video fields to a display in the order in which the video fields are to be displayed.

3. The method according to claim 2 wherein each data structure is provided to the display controller with a video field that is fully displayed at least one field before the video field with which the data structure is associated.

4. The method according to claim 3 wherein the at least one field before the video field with which the data structure is associated comprises exactly one field before the video field with which the data structure is associated.

5. The method according to claim 2 wherein the display decodes each video field and data structure.

6. The method according to claim 2 wherein each data structure contains properties of the video field with which the data structure is associated.

7. The method according to claim 6 wherein the display displays each video field using the video field's properties.

8. The method of claim 1, wherein the non-pixel data comprises luminance frame buffer start address information.

9. The method of claim 1, wherein the non-pixel data comprises chrominance interpolation mode information.

10. The method of claim 1, wherein the non-pixel data comprises size information.

11. The method of claim 1, wherein the non-pixel data comprises aspect ratio.

12. The method of claim 1, wherein the non-pixel data comprises source polarity.

13. A non-transitory computer readable medium encoded with a computer program comprising computer executable instruction for performing a method for preparing encoded video fields for display, comprising:
  decoding the video fields; decoding non-pixel data associated with the video fields;
  gathering the non-pixel data associated with each one of the video fields;
  packaging the gathered non-pixel data associated with each one of the video fields in data structures, wherein each data structure is associated with one video field; and
  providing the data structures packaging the gathered non-pixel data associated with each one of the video fields to a display controller prior to displaying each one of the video fields that the data structures are associated with.

14. The non-transitory computer readable medium according to claim 13 wherein the method comprises encoding each data structure with a video field; and
  sending the video fields to a display in the order in which the video fields are to be displayed.

15. The non-transitory computer readable medium according to claim 14 wherein the method comprises encoding each data structure with a video field that is displayed at least one field before the video field with which the data structure is associated.

16. The non-transitory computer readable medium according to claim 15 wherein the at least one field before the video field with which the data structure is associated comprises exactly one field before the video field with which the data structure is associated.

17. The non-transitory computer readable medium according to claim 14 wherein the method further comprises decoding each video field and data structure.

18. The non-transitory computer readable medium according to claim 14 wherein each data structure contains properties of the video field with which the video field is associated.

19. The non-transitory computer readable medium according to claim 18 wherein the method further comprises displaying each video field using the video field's properties.

* * * * *